(12) United States Patent
Dietrich et al.

(10) Patent No.: US 12,109,521 B2
(45) Date of Patent: Oct. 8, 2024

(54) CLEANING DEVICE AND METHOD FOR CLEANING A FILTER ARRANGEMENT

(71) Applicant: Mack GmbH, Waldenburg (DE)

(72) Inventors: Marco Dietrich, Schwaebisch-Hall (DE); Walter Mack, Mainhardt (DE)

(73) Assignee: MACK GMBH, Waldenburg (DE)

( * ) Notice: Subject to any disclaimer, the term of this patent is extended or adjusted under 35 U.S.C. 154(b) by 0 days.

(21) Appl. No.: 18/209,038

(22) Filed: Jun. 13, 2023

(65) Prior Publication Data

US 2023/0347269 A1 Nov. 2, 2023

Related U.S. Application Data

(63) Continuation of application No. PCT/EP2021/080025, filed on Oct. 28, 2021.

(30) Foreign Application Priority Data

Dec. 15, 2020 (DE) ...................... 10 2020 133 470.2

(51) Int. Cl.
*B01D 41/04* (2006.01)
*F01N 3/023* (2006.01)

(52) U.S. Cl.
CPC ........... *B01D 41/04* (2013.01); *F01N 3/0237* (2013.01)

(58) Field of Classification Search
CPC ......... B01D 41/04; F01N 3/0237; F01N 3/00; F01N 3/021
See application file for complete search history.

(56) References Cited

U.S. PATENT DOCUMENTS 7,410,529 B2 * 8/2008 Sellers .................... B01D 46/71
55/303
7,410,530 B2 * 8/2008 Wagner .................. B01D 41/04
55/293

(Continued)

FOREIGN PATENT DOCUMENTS

CN 1750861 A 3/2006
CN 106103925 A 11/2016

(Continued)

OTHER PUBLICATIONS

EP 1336729 (Year: 2003).*

(Continued)

*Primary Examiner* — Alexander Markoff
(74) *Attorney, Agent, or Firm* — REISING ETHINGTON P.C.

(57) ABSTRACT

A cleaning device for cleaning a filter arrangement which has a first fluid connection, a second fluid connection, and a filter assembly between the first and second fluid connections and which has a surface to which contaminants can adhere. A generator device for generating a gas-fluid mixture includes a receiving chamber for receiving a fluid, and a pressurized gas generating device. A first pipe assembly is connected to the generator device so that the gas-fluid mixture can be provided under pressure into the filter arrangement. A second pipe assembly is connectable to the second fluid connection and a collection device. The collection device collects the gas-fluid mixture and contaminants entrained from the filter arrangement. The first pipe assembly has a deflection pipe section which allows the receiving chamber to be filled with fluid without fluid entering the filter arrangement before the gas-fluid mixture is generated.

10 Claims, 6 Drawing Sheets

(56) References Cited

U.S. PATENT DOCUMENTS

| | | | |
|---|---|---|---|
| 8,256,060 B2* | 9/2012 | Wagner | F01N 3/023 15/406 |
| 8,273,185 B2* | 9/2012 | Milles | F01N 3/0233 95/278 |
| 11,058,978 B2 | 7/2021 | Dietrich et al. | |
| 11,517,846 B2* | 12/2022 | Chilumukuru | B01D 46/2418 |
| 2004/0045439 A1 | 3/2004 | Zilliox et al. | |
| 2004/0103788 A1* | 6/2004 | Streichsbier | B01D 41/04 95/279 |
| 2005/0011357 A1* | 1/2005 | Crawley | B01D 41/04 96/228 |
| 2006/0060521 A1 | 3/2006 | Harms et al. | |
| 2006/0248864 A1* | 11/2006 | Streichsbier | B01D 41/04 55/283 |
| 2008/0083334 A1 | 4/2008 | Bardhan et al. | |
| 2009/0056288 A1* | 3/2009 | Waldo | B01D 41/04 134/22.12 |
| 2010/0037423 A1* | 2/2010 | Herman | F01N 13/00 15/406 |
| 2012/0234747 A1 | 9/2012 | Harms et al. | |
| 2015/0000701 A1* | 1/2015 | Tevely | F01N 3/0237 134/10 |
| 2016/0326926 A1 | 11/2016 | Kahlert | |
| 2017/0036148 A1 | 2/2017 | Dietrich et al. | |
| 2017/0211440 A1* | 7/2017 | Salsgiver | F01N 3/035 |
| 2017/0333816 A1 | 11/2017 | Olschok | |
| 2020/0261838 A1 | 8/2020 | Chilumukuru et al. | |

FOREIGN PATENT DOCUMENTS

| | | |
|---|---|---|
| CN | 106422530 A | 2/2017 |
| CN | 106968761 A | 7/2017 |
| CN | 107106949 A | 8/2017 |
| CN | 111561373 A | 8/2020 |
| DE | 60037220 T2 | 12/2008 |
| DE | 102015112939 A1 | 2/2017 |
| EP | 1336729 A1 | 8/2003 |
| EP | 2500078 A2 | 9/2012 |
| EP | 3412355 A1 | 12/2018 |
| GB | 2472104 A | 1/2011 |
| JP | 2003088717 A | 3/2003 |
| JP | 2003334414 A | 11/2003 |
| JP | 2013500421 A | 1/2013 |
| JP | 6765111 B1 | 10/2020 |
| KR | 20190137372 A | 12/2019 |
| WO | WO-2008054262 A1 * | 5/2008 ............ B01D 41/04 |
| WO | WO2011012876 A1 | 2/2011 |
| WO | WO2013056378 A1 | 4/2013 |
| WO | WO-2015001375 A1 * | 1/2015 ............ B01D 41/04 |

OTHER PUBLICATIONS

DE 102015112939 (Year: 2015).*
EP 1060780 (Year: 2000).*
International Search Report and Written Opinion issued for PCT/EP2021/080025 on Mar. 4, 2022.
Office Action issued by the German Patent Office for application DE 10 2020 133 470.2 on Jul. 2, 2021.
English Translation of the Office Action issued by the German Patent Office for application DE 10 2020 133 470.2 on Jul. 2, 2021.
Office Action issued by the Japanese Patent Office for application JP 2023-535885 on Jan. 11, 2024.
English Translation of the Office Action issued by the Japanese Patent Office for application JP 2023-535885 on Jan. 11, 2024.
English translation of the International Preliminary Report on Patentability issued for PCT/EP2021/080025 on Jun. 13, 2023.
Office Action and Search Report issued by the CNIPA for application CN 202180084846.6 on Mar. 22, 2024.
English Translation of the Office Action issued by the CNIPA for application CN 202180084846.6 on Mar. 22, 2024.
English Translation of the Search Report issued by the CNIPA for application CN 202180084846.6 on Mar. 22, 2024.

* cited by examiner

CLEANING DEVICE AND METHOD FOR CLEANING A FILTER ARRANGEMENT

CROSS-REFERENCE TO RELATED APPLICATIONS

This is a Continuation application of International patent application PCT/EP2021/080025, filed 28 Oct. 2021, which claims the priority of German patent application DE102020133470, filed 15 Dec. 2020, the entire content of these earlier applications being incorporated herein by reference.

FIELD

The present disclosure generally relates to a cleaning device for cleaning a filter arrangement which comprises a first fluid connection, a second fluid connection, and a filter assembly arranged between the first and second fluid connections and which comprises a surface to which contaminants can adhere, the cleaning device comprising a generator device for generating a gas-fluid mixture, the generator device having a receiving chamber for receiving a fluid and a pressurized gas generating device connectable to the receiving chamber, a first pipe assembly connected to the generator device and having a first pipe connection connectable to the first fluid connection for directing the gas-fluid mixture under pressure into the filter assembly, and a second pipe assembly having a second pipe connection connectable to the second fluid connection and connected to a collection device for collecting the gas-fluid mixture directed through the filter arrangement and contaminants entrained from the filter arrangement.

Further, the present disclosure relates to a method of cleaning a filter arrangement of the type described above, the method comprising the steps of: arranging the filter arrangement in a cleaning device, at least partially filling a receiving chamber with a fluid, and generating a cleaning pulse in which gas from a pressurized gas generating device is directed under pressure into the receiving chamber so that a gas-fluid mixture is forced through the filter arrangement and out of the second fluid connection.

BACKGROUND

A diesel particulate filter cleaning method and a corresponding device are known from document DE 10 2015 112 939 A1. Here, a diesel particulate filter is arranged above a receiving chamber for a fluid. The receiving chamber is partially filled with the fluid. A gas is then introduced under pressure into the receiving chamber from below the surface of the fluid, so that a gas-fluid mixture is generated which is forced by the pressure through the filter assembly via the first fluid connection and out of the second fluid connection.

The filter arrangement is arranged above the receiving chamber such that the first fluid connection faces the receiving chamber. In the installed state of the filter arrangement, the first fluid connection faces the exhaust gas side. The second fluid connection, on the other hand, is the one that faces the diesel engine when the filter arrangement is installed. In this way, the contaminants present in the filter assembly can be driven out of the filter assembly against the operating flow direction of the filter arrangement, i.e. in the prior art, from the bottom upwardly to the top.

The side of the filter assembly facing the diesel engine in the installed state (at the second fluid connection) is typically cleaned superficially before installation in the cleaning device, for example by means of a high-pressure cleaning device or the like. In this way, adhering ash and the like, in particular in the area of a flange of the second fluid connection, can be cleaned or rinsed off before the filter arrangement is inserted into the above-mentioned cleaning device. Since this pre-cleaning is only superficial, no fluid settles inside the filter assembly during this process.

This achieves the particular advantage that during the subsequent cleaning by means of the cleaning pulse, the gas-fluid mixture is propelled through the filter assembly in the form of a mixture of gas and water droplets (aerosol mixture), so that the kinetic energy of the droplets, which are forced through the filter assembly at high speed, can efficiently separate and discharge the adhering contaminants, as has also been described in above-mentioned document DE 10 2015 112 939 A1.

Here, it is also important that the second fluid connection through which the gas-fluid mixture is expelled, is either completely open or is connected to a collection device which has a very large volume, i.e. allows the gas-fluid mixture to enter with as little counterpressure as possible.

SUMMARY

Against this background, it is an object of the disclosure to provide an improved cleaning device and an improved cleaning method for cleaning a filter arrangement, in particular a diesel particulate filter.

The above object may be solved by a cleaning device according to claim 1, wherein the first pipe connection is arranged above the second pipe connection in gravity direction, wherein the first pipe assembly comprises a deflecting pipe section connecting the receiving chamber of the generator device to the first pipe connection, such that the receiving chamber can be filled with fluid without the fluid entering the filter arrangement prior to generating the gas-fluid mixture.

By this, the same advantageous cleaning concept can be applied as has been described in document DE 10 2015 112 939 A1. However, in the cleaning device according to the present disclosure, the gas-fluid mixture is passed through the filter arrangement from top to bottom. In the cleaning device, the filter arrangement is consequently arranged in such a way that the second fluid connection, which is the upstream connection (facing the diesel engine) of the filter arrangement, is at the bottom, i.e. below the first fluid connection in gravity direction. In the present cleaning device, too, the filter arrangement is consequently cleaned on the countercurrent principle by passing the gas-fluid mixture through the filter assembly in the opposite direction to the normal filter direction.

The collection device for collecting the gas-fluid mixture passed through the filter arrangement is configured to have either a very large volume or an elastically expandable volume, such that the gas-fluid mixture can be driven through the filter assembly substantially unimpeded.

In the cleaning device, it is advantageous if the first pipe assembly is constructed such that the gas-fluid mixture generated by the generator device is guided under pressure against the force of gravity upwards, then through the deflecting pipe section and finally downwards in the direction of the filter arrangement onto the first fluid connection.

Also, the introduction of the gas into the receiving chamber is carried out preferably below the fluid level in the receiving chamber, preferably in a region of the lower third of the fluid as viewed in the center of gravity direction.

In the present cleaning device, it is also advantageous that the filter assembly is substantially dry, at least not filled with fluid, before the gas-fluid mixture is forced under pressure through the filter assembly. With regard to the advantages achievable thereby, reference is made to the disclosure of document DE 10 2015 112 939 A1, the entire disclosure content of which is incorporated herein by reference. In particular, the details regarding the number of cleaning pulses, the temperatures, the volume of the receiving chamber, the volume of the filter arrangement, the type of cleaning fluid, etc., can be realized identically as in said document.

In particular, it is also advantageous in the cleaning device according to the present disclosure that the surface of the filter assembly on the side of the second fluid connection can be pre-treated, in particular pre-cleaned, via the second pipe assembly, without it being necessary to re-clamp the filter arrangement. In other words, the filter arrangement can be completely cleaned in the cleaning device while it is arranged between the first pipe connection and the second pipe connection.

Pre-cleaning the lower side of the filter assembly on the side of the second fluid connection may be performed as desired. For example, the pre-cleaning may include combustion.

It is of particular advantage, if a fluid spraying device is arranged in the second pipe assembly, which fluid spraying device comprises at least one spray nozzle directed towards the filter assembly.

By means of the fluid spraying device, the surface of the filter assembly on the side of the second fluid connection can be pre-cleaned, namely by spraying a spray fluid, which may be water. However, a cleaning agent may also be mixed into the spray fluid, which may be soap-like.

It is not impossible for spray fluid to enter the interior of the filter assembly. However, due to the arrangement of the filter arrangement with the second fluid connection below the first fluid connection (as seen in gravity direction), the penetrating spray fluid always flows downwards in the same way, namely in the direction of the second pipe assembly.

The fluid spraying device is preferably designed in such a manner that it can clean not only the surface of the filter assembly, but also a peripheral region thereof, in particular a region of a flange section, within which contaminants such as ash, soot, etc., can also accumulate. By means of the fluid spraying device, the filter arrangement in the area of the second fluid connection can consequently be cleaned in advance in such a way that no further subsequent cleaning is required after the subsequent cleaning by means of the gas-fluid mixture.

The spray nozzle consequently sprays the spray fluid preferably against the force of gravity upwards against the side of the filter assembly and into its circumferential region.

It is of particular advantage if the fluid spraying device comprises a spray bar which extends transversely to a longitudinal direction and on which a plurality of spray nozzles are arranged.

It is further advantageous if the spraying device is rotatable about a longitudinal axis.

Hereby, similar to a dishwasher, a high cleaning effect can be generated from many directions, so that excellent pre-cleaning can be achieved.

Preferably, the second pipe assembly comprises a siphon-like pipe section, in which spray fluid and contaminants can collect, which have been separated from the filter assembly by means of the fluid spraying device.

Hereby, it can be achieved that the spray fluid does not necessarily reach the subsequent collection device, in particular that it is not subsequently entrained by the gas-fluid mixture flowing into the second pipe assembly in the direction of the collection device.

Rather, it is of particular advantage if the siphon-like pipe section comprises a drain via which spray fluid and contaminants can be removed from the second pipe assembly.

The drain is preferably arranged in a lower region of the siphon-like pipe section, so that, after the pre-cleaning, by means of the fluid spraying device substantially no large amounts of contaminants dissolved by the pre-cleaning are present in the siphon-like pipe section.

This is advantageous, because the contaminants dissolved by the fluid spraying device are often soot-like or contain soot-like components, which are preferably treated differently with regard to post-treatment or reprocessing than the gas-fluid mixture.

Furthermore, it is advantageous if at least a portion of the first pipe assembly is slidable in a longitudinal direction to facilitate insertion of the filter arrangement between the first pipe connection and the second pipe connection.

In this regard, the portion of the first pipe assembly may be manually displaceable in a longitudinal direction. Preferably, the longitudinal direction is parallel to the gravity direction.

It is of particular preference if the first pipe assembly is assigned to a first adjustment motor, by means of which the at least one portion of the first pipe assembly is displaceable in the longitudinal direction.

The first adjustment motor is preferably an electric motor, which, e.g. via a spindle and, preferably via an angular gear, drives at least one lifting rod, by means of which a lifting plate can be displaced in the longitudinal direction, to which the at least one portion of the first pipe assembly is fixed, in particular the entire first pipe assembly.

In this context, it is of particular advantage if the first pipe connection can be placed on the first fluid connection in a force-controlled manner by the first adjustment motor.

In this case, the force control can be performed via suitable software, so that the first adjustment motor is controlled accordingly. However, in general, a spring arrangement can also be arranged between a drive member of the first adjustment motor and the first pipe assembly in order to be able to place the first pipe connection on the first fluid connection in a force-controlled manner.

According to another overall preferred embodiment, the cleaning device includes a loading arrangement that is displaceable in a direction transverse to a longitudinal direction axis in order to arrange a filter arrangement in a cleaning position above the second pipe connection.

The loading arrangement is thereby preferably designed in the manner of a horizontally movable carriage, onto which a filter arrangement can be placed laterally next to the second pipe connection, and can then be arranged by means of the carriage in a position (cleaning position) above the second pipe connection.

In this respect, it is of particular advantage if a second adjustment motor is assigned to the loading arrangement, which can move the loading arrangement between the cleaning position and a loading position.

The second adjustment motor may also be an electric motor. The second adjustment motor may be a linear actuator capable of horizontally moving a filter receptacle or a carriage to which the filter receptacle is fixed. The linear actuator may be a classic electric motor with a rotary-translation transducer, but may also be a linear electric motor.

Both the first adjustment motor and the second adjustment motor may also be electromagnetic drives, pneumatic drives, or hydraulic drives in alternative embodiments.

It is understood that the above-mentioned features of the disclosure and those still to be explained below can be used not only in the respectively given combination, but also in other combinations or in isolation, without leaving the scope of the disclosure.

DRAWINGS

Further features and advantages of the disclosure will be apparent from the following description of preferred embodiments with reference to the drawings. In the drawings.

EMBODIMENTS

Figure 1:
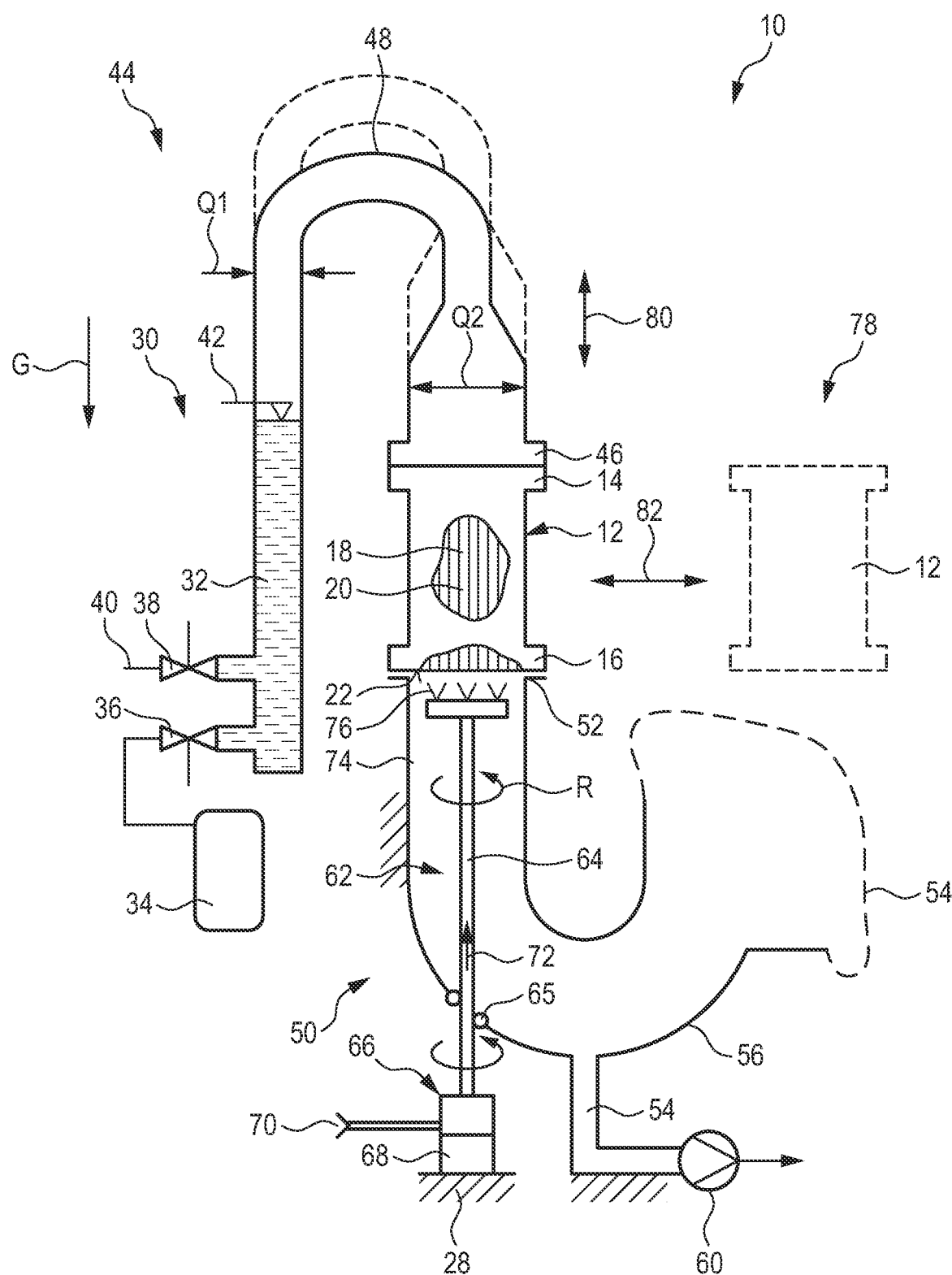
FIG. 1 shows a schematic side view of a first embodiment of a cleaning device according to the disclosure.
Figure 2:
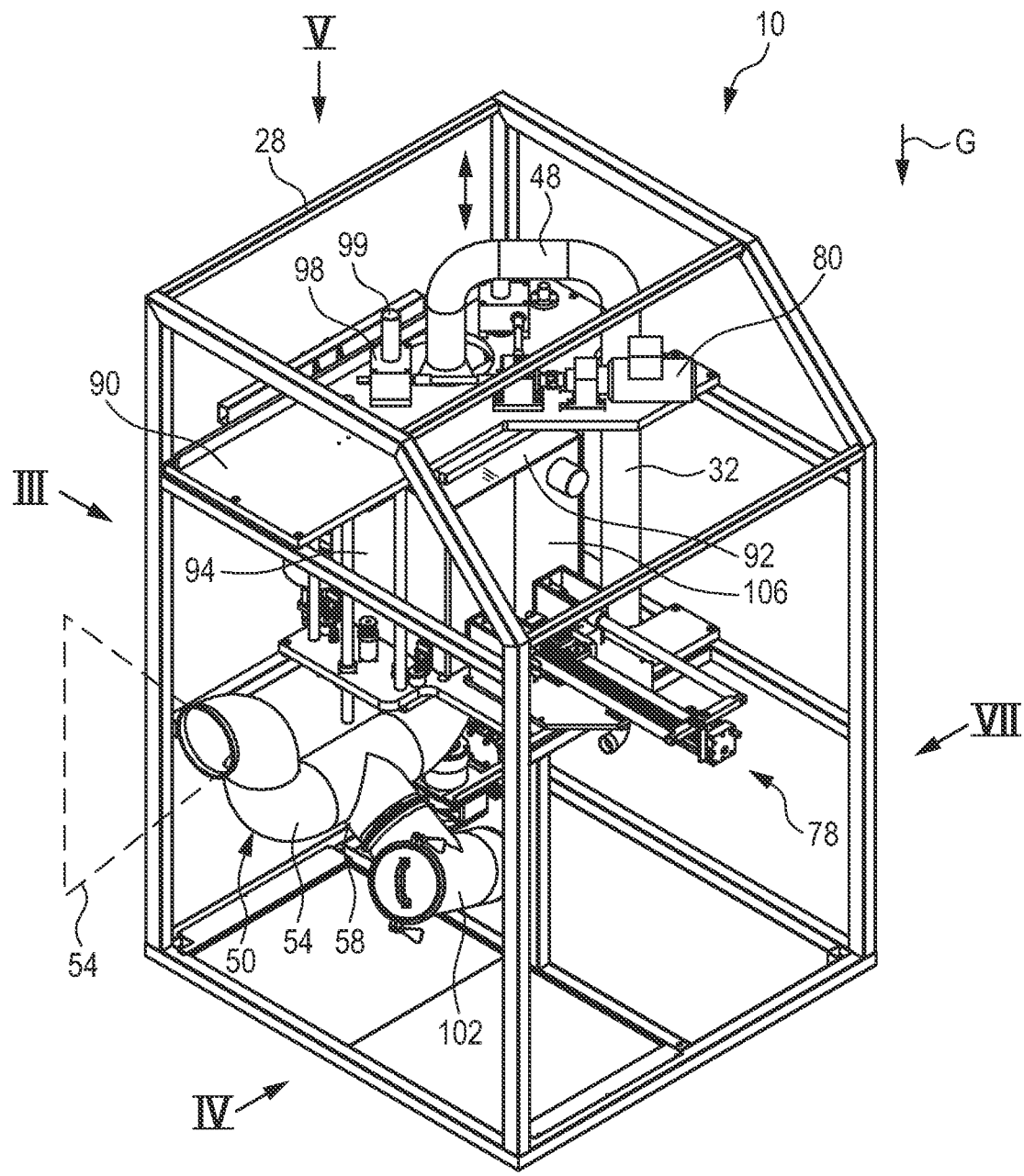
FIG. 2 shows a perspective schematic representation of a further embodiment of a cleaning device according to the disclosure.
Figure 3:
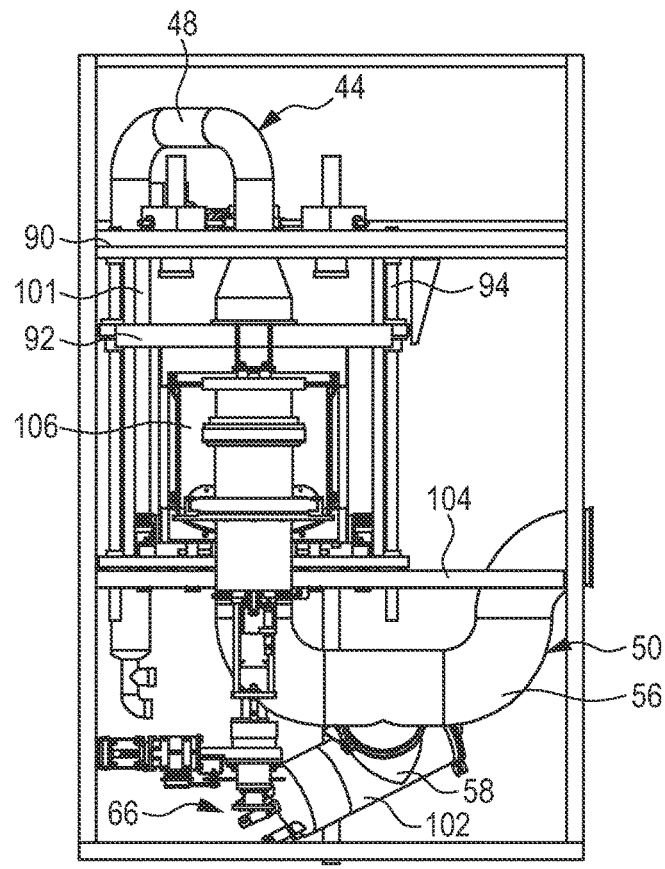
FIG. 3 shows a side view of the cleaning device of FIG. 2 from a viewing direction III.
Figure 4:
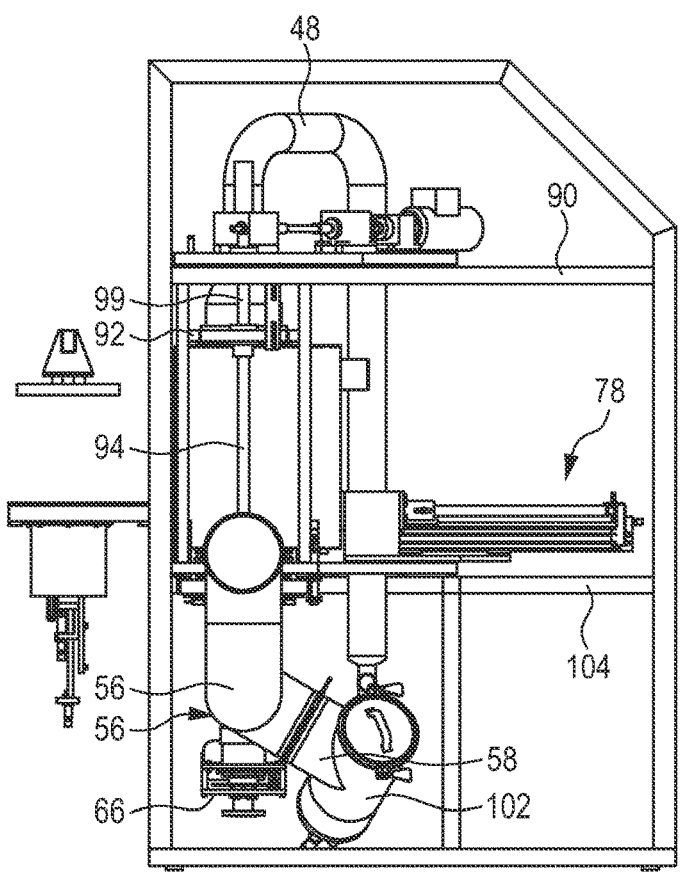
FIG. 4 shows a side view of the cleaning device of FIG. 2 from a viewing direction IV.
Figure 5:
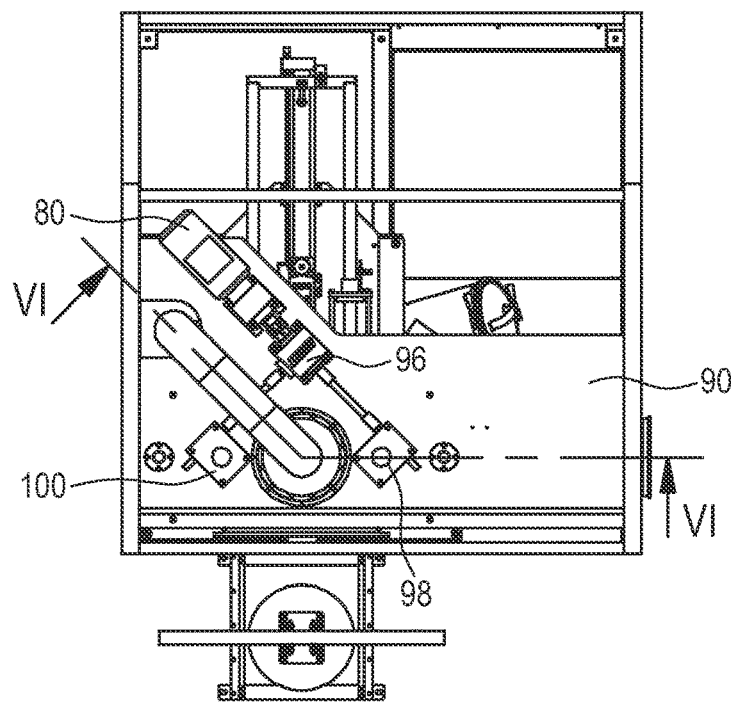
FIG. 5 shows a side view of the cleaning device of FIG. 2 from a viewing direction V.

In FIG. 1, an embodiment of a cleaning device is schematically shown and generally designated by 10.

The cleaning device 10 is used for cleaning a filter arrangement 12, in particular in the form of a diesel particulate filter, which is usually installed in the exhaust tract of a diesel engine-powered motor vehicle.

The filter arrangement 12 comprises a first fluid connection 14, which represents the outlet side in the installed state of the filter arrangement 12. Furthermore, the filter arrangement 12 comprises a second fluid connection 16, which, in the installed state of the filter arrangement, represents an inlet side, i.e. faces the drive engine (in particular diesel engine).

Between the first fluid connection 14 and the second fluid connection 16, which face each other along a longitudinal axis, a filter assembly 18 is arranged which includes a plurality of longitudinal channels 20. With respect to the general and specific construction of such filter arrangements, reference is made to the general knowledge of diesel particulate filters.

At 22, a surface of the filter assembly 18 is shown on the side of the second fluid connection 16.

The cleaning device 10 comprises a housing 28. A generator device 30 is arranged on the housing 28, in particular arranged in a displaceable manner, as will be explained below. The generator device 30 comprises a receiving chamber 32 for receiving a quantity of fluid, wherein the fluid can in particular be water to which additives can be mixed, as described in document DE 10 2015 112 939 A1.

Further, the generator device 30 has a pressurized gas generating device 34, which may include a pressure tank and a compressor. In any case, the pressurized gas generating device 34 can hold gas, in particular air, at a pressure of, for example, 8 bar and with a volume of, for example, 2 $m^3$, so that the volume in the expanded state could be, for example, 16 $m^3$.

The pressurized gas generating device 34 is connected to a lower portion of the receiving chamber 32 via a gas valve 36. The receiving chamber 32, in particular a lower portion thereof, is connected to a supply of cleaning fluid 40 (in particular water) via a fluid valve 38.

Consequently, when the gas valve 36 is closed, fluid can first be introduced into the receiving chamber 32 up to a fluid level 42 arranged above the valves 36, 38. Subsequently, the fluid valve 38 may be closed.

The valves 36, 38 are particularly located in a lower third of the receiving chamber 32, relative to a lower end of the receiving chamber and the fluid level 42.

The receiving chamber 32 is connected via a first pipe assembly 44 to a first pipe connection 46 configured to be sealingly connected to the first fluid connection 14.

The first pipe assembly 44 has a deflection pipe section 48, extending above the receiving chamber 32, first vertically upwardly, against a gravity direction G, then having a U-shaped portion, and further including an unspecified portion from the U-shaped portion to the first pipe connection 46, extending from the U-shaped portion downwardly parallel to the gravity direction G to the first pipe connection 46.

The cross section or cross-sectional area of the first pipe assembly 44 may be constant, but is preferably configured such that the first pipe assembly 44 has a first cross section Q1 in the region adjacent to the receiving chamber 32 that is smaller than a second cross section Q2 that the first pipe assembly 44 has in a region adjacent to the first pipe connection 46.

The cleaning device 10 further includes a second pipe assembly 50 that includes a second pipe connection 52. The second pipe connection 52 is configured to be connected to the second fluid connection of the filter arrangement 12.

The second pipe assembly 50 is connected at its other end to a collection device 54, which may include, for example, a droplet separator, similar to what is described in document DE 10 2015 112 939 A1.

Between the second pipe connection 52 and the transition into the collection device 54, the second pipe assembly 50 has a siphon-like pipe section 56, at the lower end of which a drain 58 is provided, via which fluid can be discharged. Optionally, a pump 60 is integrated in the drain 58.

In FIG. 1, the filter arrangement 12 is shown in a cleaning position in which it is connected with its second fluid connection 16 to the second pipe connection 52, and in which the first fluid connection 14 is sealingly connected to the first pipe connection 46.

Consequently, by means of the cleaning device, cleaning can be performed such that fluid is first filled into the receiving chamber 32 until the fluid has reached a certain fluid level 42. Subsequently, the gas valve 36 is opened so that a blast of pressurized air is introduced into the lower portion of the receiving chamber 32 so that the fluid contained in the receiving chamber 32 is churned or foamed and driven out toward the first pipe connection 46, via the deflection pipe section 48.

The gas-fluid mixture then enters the filter assembly 18 under high pressure and at high velocity, passes through the filter assembly 18, entraining contaminants of any kind. The gas-fluid mixture then exits the surface 22 and enters the second pipe assembly 50, where it is directed, via the siphon-like pipe section 56, toward the collection device 54, where the gas-fluid mixture is allowed to expand. The fluid contained therein is collected via a droplet separator, so that subsequent environmentally compatible post-processing of the collected gas-fluid mixture, which is mixed with contaminants, can be carried out.

As described in document DE 10 2015 112 939 A1, a plurality of such cleaning pulses can be performed. Subsequently, at least one drying pulse may also be performed, during which gas is introduced into the empty receiving chamber 32.

In the cleaning device 10, the filter arrangement 12 is clamped in such a way that, viewed in the gravity direction G, the second fluid connection 16 is arranged below the first fluid connection 14.

The filter arrangement 12 can thereby be inserted into the cleaning device in a completely uncleaned state.

To remove in advance soot and other types of sooting adhering to the surface 22 of the filter assembly 18, in particular also in a flange section area of the second fluid connection 16, a fluid spraying device 62 is provided.

The fluid spraying device 62 comprises a drive shaft 64 that penetrates a wall of the second pipe assembly 50 via a rotary feedthrough 65. A supply device 66 located outside the second pipe assembly 50 is used to drive, by means of a drive motor 68, the drive shaft 64 which extends in the longitudinal direction parallel to the gravity direction.

Further, the supply means 66 includes a fluid supply device 70 by means of which a spray fluid, which may be water or water to which a cleaning agent is added, can be supplied through the drive shaft 64 (which is formed as a hollow shaft) to a spray bar 74.

The fluid 72 that is supplied by the fluid supply device 70 and directed to the spray bar 74 via the drive shaft 64, is ejected at the spray bar 74 via a plurality of spray nozzles 76.

The spray bar 74 is arranged in close proximity to the surface 22 and oriented substantially parallel thereto. The spray bar may have a length transverse to the longitudinal direction that is in the range of 0.3 to 0.9 of the diameter of the surface 22, preferably in the range of 0.5 to 0.8 of that diameter.

The distance between the spray bar 74 and the surface 22 is preferably less than the length of the spray bar in the transverse direction, and may for example be in a range of 5 cm to 20 cm.

The spray nozzles 76 are arranged along the spray bar 74 so that they can collectively spray the entire diameter of the surface 22 as well as adjacent areas of the flange portion of the second fluid connection 16.

By means of the drive motor 68, the drive shaft 64 and consequently the spray bar 74 can be caused to rotate, as shown in FIG. 1 at R.

Consequently, the spray bar 74 can be used to spray the entire area to be cleaned.

The spray fluid 72 may penetrate somewhat into the longitudinal channels 20 from the side of the surface 22, but immediately drips away downwardly. The used spray fluid that has exited the spray nozzles 76, and contaminants washed off with it, collect in a lower portion of the siphon-like pipe section 56, where they can be discharged via the drain 58.

Consequently, with a single "clamping" it is possible to perform a preliminary cleaning at the surface 22 of the filter arrangement 12, and then perform, without removing the filter arrangement 12, a cleaning process in which a gas-fluid mixture is forced through the filter assembly 18 under high pressure and at high velocity, starting from the side of the first fluid connection 14 towards the second fluid connection 16.

The gas-fluid mixture exiting the second fluid connection 16 encounters the spray bar 74, but the spray bar 74 forms a relatively small cross-sectional area compared to the total area of the surface 22 and consequently does not significantly interfere with the flow of the gas-fluid mixture out of the filter assembly 18.

In FIG. 1, it is further shown that the cleaning device 10 may include a loading arrangement 78 for moving filter arrangements 12 from outside the cleaning device 10 to a cleaning position in which the filter arrangement 12 is arranged between the pipe connections 46, 52. This can be done by means of a second adjustment motor 82.

A first adjustment motor 80 may be configured to adjust at least a portion of the first pipe assembly 44, in particular the entire pipe assembly 44, in a direction parallel to the gravity direction in order to enable a filter arrangement 12 to be inserted between the pipe connections 46, 52—in particular in an automated manner—and in order to subsequently place the first pipe connection 46 on the first fluid connection 14 with a certain force in such a way that a type of ring seal is formed. In this way, it can be avoided that the gas-fluid mixture fed under high pressure via the first pipe connection 46 into the filter assembly 18 escapes laterally between the first fluid connection 14 and the first pipe connection 46.

FIGS. 2 to 9 show a further embodiment of a cleaning device 10, which generally corresponds to the cleaning device 10 of FIG. 1 with regard to structure and mode of operation. Identical elements are therefore designated by identical reference signs. In the following, essentially the differences are described.

As shown in FIGS. 2 to 9, the housing 28 comprises a frame to which a first bearing plate 90 is fixed that extends in a horizontal direction. Attached to the first bearing plate 90, the first adjustment motor 80 in the form of an electric motor is arranged. Further, the first pipe assembly 44 is arranged with respect to the first bearing plate 90 such that the deflection pipe section 48 is arranged above the first bearing plate 90. That pipe section which extends towards the receiving chamber 32 and that pipe section which extends towards the first pipe connection 46 are slidably guided through the first bearing plate 90.

A lifting plate 92 is further mounted to the housing 28 for movement in the gravity direction G. That section of the first pipe assembly 44 which leads to the first pipe connection 46 (and which has the slightly larger cross section Q2) is fixed to the lifting plate 92.

The lifting plate 92 can be driven in a vertical direction. For this purpose, a drive shaft of the first adjustment motor 80 is connected to a transfer gear 96. The transfer gear 96 is connected, via further spindles, to a first angular gear 98, which drives a first lifting rod 99 in the vertical direction, and is connected, via a further spindle, to a second angular gear 100, which drives a second lifting rod 101 parallel to the first lifting rod 99. The two lifting rods 99, 101 are connected to the lifting plate 92 to be able to drive the first pipe assembly 44 in a vertical longitudinal direction.

Figure 6:
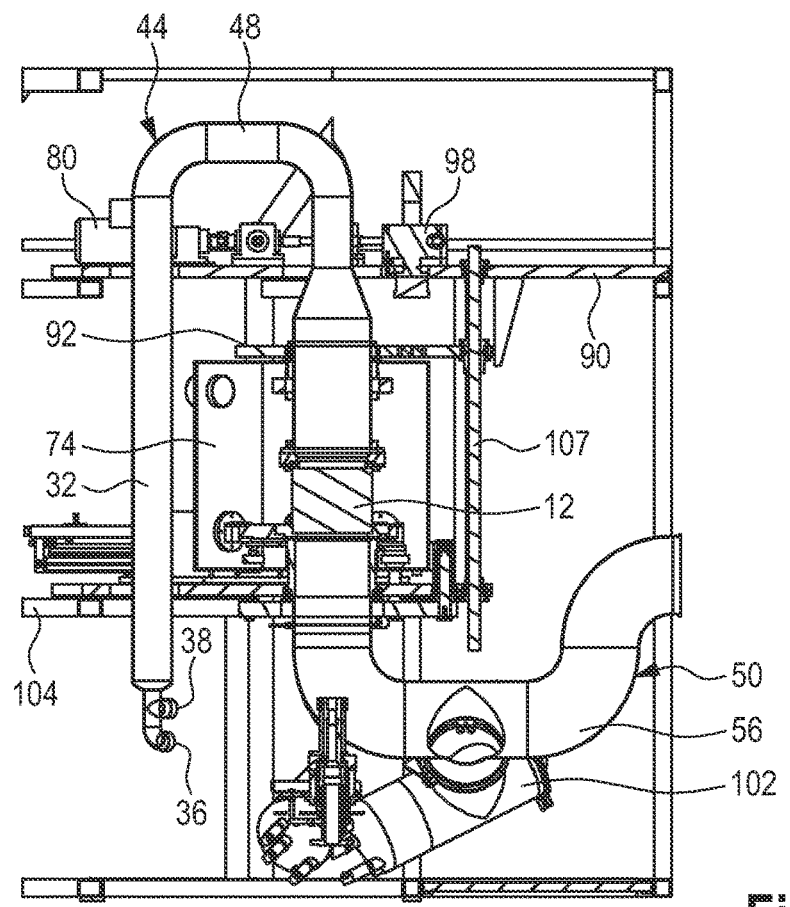
FIG. 6 shows a sectional view along a line VI-VI in FIG. 5.

As can be readily seen, particularly in FIG. 6, the outlet of the siphon-like pipe section 56 is connected to an inclined drain pipe section 102 through which the spray fluid and contaminants cleaned off with it can be selectively discharged.

A second bearing plate 104 is fixed to the housing 28 below the first bearing plate 90. Attached to the second bearing plate 104, the second pipe assembly 50 is fixed, such that the second pipe connection 52 is located above the second bearing plate 104.

The loading arrangement 78 is arranged on the second bearing plate 104.

The second bearing plate 104 and the first bearing plate 90 may be connected to each other via a carrier plate 107, as shown in particular in FIG. 6.

A cage 94 is arranged between the first bearing plate 90 and the second bearing plate 104, which cage 94 surrounds at least partially the area of the pipe connections 46, 52.

The loading arrangement 78 includes a linear actuator 108 that drives a loading rod 110 in a horizontal direction, the loading rod 110 extending through the cage 94.

Figure 7:
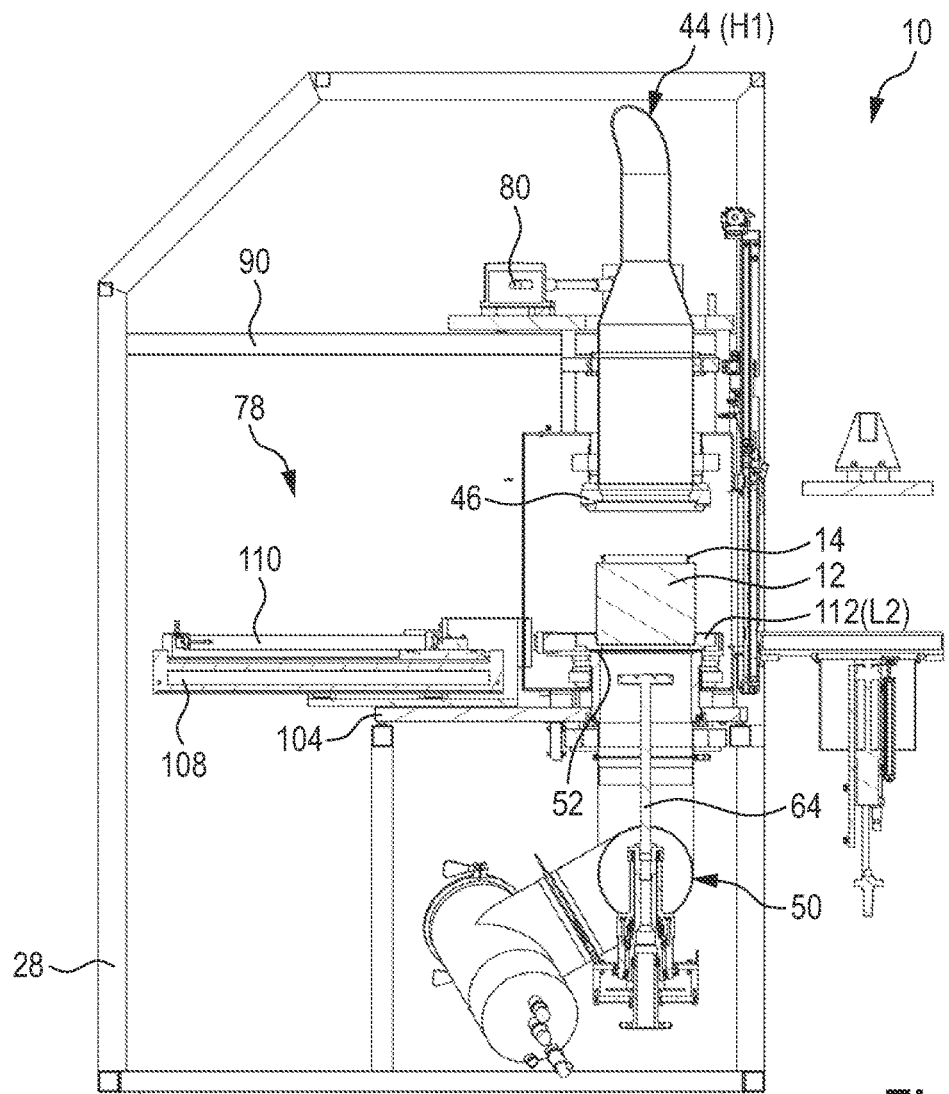
FIG. 7 shows a side view of the cleaning device of FIG. 2 from a viewing direction VII in which a loading arrangement is in a cleaning position.
Figure 8:
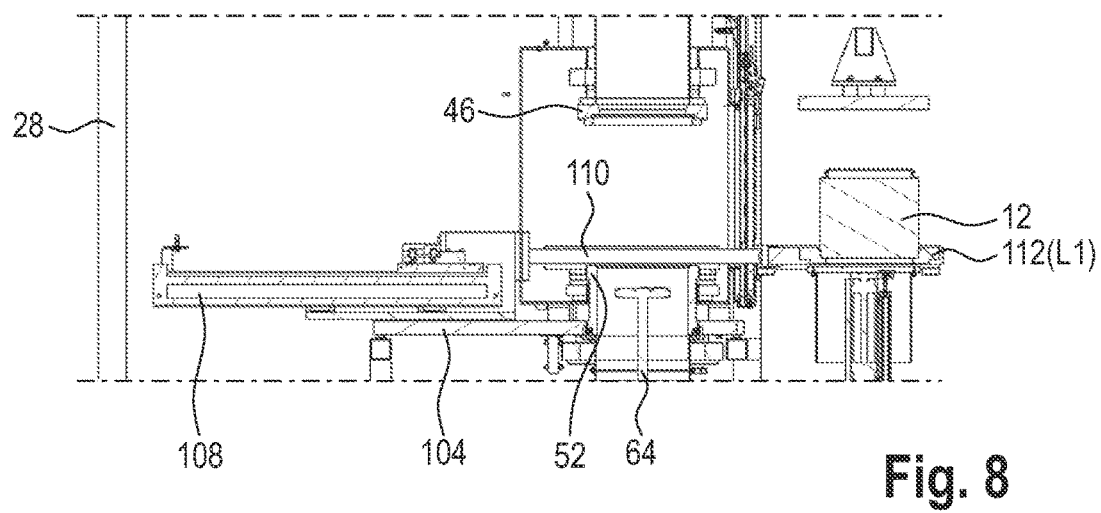
FIG. 8 shows a partial view of FIG. 7, in which the loading arrangement is in a loading position.

As shown in FIGS. 7 to 8, the loading arrangement 78 may be moved to a loading position L1 in which a filter receptacle 112 connected to the loading rod 110 is positioned laterally adjacent the pipe connections 46, 52 for convenient placement of a filter arrangement 12 thereon for cleaning.

Subsequently, the linear actuator 108 forming the second adjustment motor 82 may be driven to move the filter receptacle 112 in a direction toward the pipe connections 46, 52 until the filter arrangement 12 is arranged in a cleaning position L2 right therebetween.

Prior to this step, the first adjustment motor 80 was driven such that the first pipe connection 46 is lifted off, as shown in FIG. 7.

In FIG. 7, the loading assembly is shown to have reached the cleaning position L2, where the filter arrangement 12 is positioned between the pipe connections 46, 52.

Figure 9:
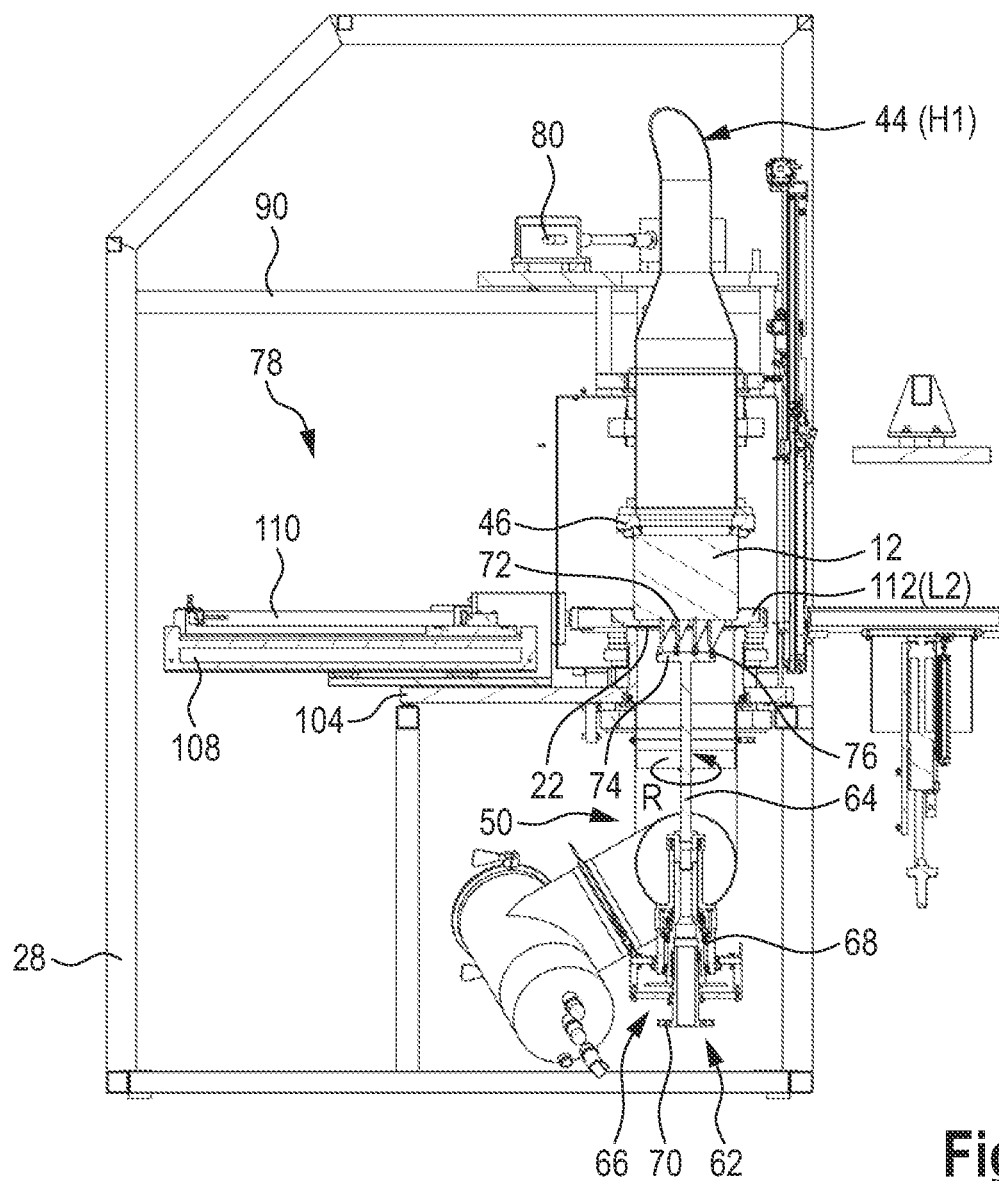
FIG. 9 shows a view comparable to FIG. 7, wherein the filter assembly is clamped with force-control between the first and second pipe connections.

Next, the first adjustment motor 80 is driven so that the first pipe connection 46 is placed onto the first fluid connection 14 in a force-controlled manner such that a ring sealing effect is achieved. This is shown in FIG. 9. In FIG. 9, it is further shown that the fluid spraying device 62 is driven to cause the spray bar 74 to rotate and to spray fluid 72 via the nozzles 76 toward the surface 22.

In a subsequent step, the fluid spraying device 62 can be rendered inoperative again so that spray fluid is no longer supplied and the spray bar 74 no longer rotates.

Subsequently, at least one cleaning pulse may be performed in which a gas-fluid mixture is generated and forced through the filter arrangement 12 from above, as described above. Further, at least one drying pulse may be performed.

Subsequently, the first adjustment motor 80 may be driven again to lift the first pipe connection 46 away from the first fluid connection 14 so that the position shown in FIG. 7 is again established. Subsequently, the loading arrangement 78 can be driven to again establish the loading position L1 so that a cleaned filter arrangement 12 can be removed from the cleaning device 10 and another filter arrangement 12 to be cleaned can be inserted.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS 10 cleaning device
12 filter arrangement
14 first fluid connection (outlet side)
16 second fluid connection (inlet side)
18 filter assembly
20 longitudinal channels
22 surface of 14
28 housing
30 generator device
32 receiving chamber
34 pressurized gas generating device
36 gas valve
38 fluid valve
40 cleaning fluid
42 fluid level
44 first pipe assembly
46 first pipe connection
48 deflection pipe section
50 second pipe assembly
52 second pipe connection
54 collection device (with droplet separator)
56 siphon-like pipe section
58 drain
60 pump
62 fluid spraying device
64 drive shaft
65 rotary feedthrough
66 supply facility
68 drive motor
70 fluid supply device
72 fluid
74 spray bar
76 spray nozzles
78 loading arrangement
80 first adjustment motor
82 second adjustment motor
90 first bearing plate
92 lifting plate
94 cage
96 transfer gear
98 first angular gear
99 first lifting rod
100 second angular gear
101 second lifting rod
102 drain pipe section, inclined
104 second bearing plate 106 support plate
107 carrier plate
108 linear actuator
110 loading rod
112 filter receptacle
G gravity direction
Q1 first cross section
Q2 second cross section
R rotation (64)
H1 first lift position
H2 second lift position
L1 loading position
L2 cleaning position

The invention claimed is:

1. A cleaning device for cleaning a filter arrangement which comprises a first fluid connection, a second fluid connection, and a filter assembly arranged between the first fluid connection and the second fluid connection and which has a surface to which contaminants can adhere, comprising:
 a generator device for generating a gas-liquid mixture, the generator device comprising a receiving chamber for receiving a liquid, and a pressurized gas generating device which is connected to the receiving chamber via a gas valve;
 a first pipe assembly connected to the generator device and comprising a first pipe connection which can be connected to the first fluid connection so as to direct the gas-liquid mixture under pressure into the filter arrangement; and
 a second pipe assembly comprising a second pipe connection which can be connected to the second fluid connection and which is connected to a collection device for collecting the gas-liquid mixture passed through the filter arrangement and contaminants entrained from the filter arrangement,
 wherein the first pipe assembly is constructed such that the gas-liquid mixture generated by the generator device is guided under pressure against the force of gravity upwards, then through a deflection pipe section and finally downwards towards the filter arrangement,
 wherein a liquid spraying device comprises a spray bar extending transversely to a direction of flow of the gas-liquid mixture in the second pipe assembly, a plurality of spray nozzles arranged on the spray bar and directed towards the filter assembly, a drive shaft connected to the spray bar, and a drive motor connected to the drive shaft, wherein the drive motor is located outside the second pipe assembly, the spray bar is located inside the second pipe assembly, and the drive shaft passes through the second pipe assembly,
 wherein the second pipe assembly comprises a siphon-like pipe section in which spray liquid and contaminants separated from the filter assembly by way of the liquid spraying device can collect.

2. The cleaning device of claim 1, wherein the liquid spraying device is rotatable about a longitudinal axis parallel to a direction of flow of the gas-liquid mixture in the second pipe assembly.

3. The cleaning device of claim 1, wherein the siphon-like pipe section includes a drain through which spray liquid and contaminants can be removed from the second pipe assembly.

4. The cleaning device of claim 1, wherein at least a portion of the first pipe assembly is slidable in a longitudinal direction to facilitate insertion of the filter arrangement between the first pipe connection and the second pipe connection.

5. The cleaning device of claim 4, further comprising a first adjustment motor assigned to the first pipe assembly, by way of which the at least one portion of the first pipe assembly can be displaced.

6. The cleaning device of claim 5, wherein the first pipe connection can be placed on the first fluid connection in a force-controlled manner by way of the first adjustment motor.

7. The cleaning device of claim 1, comprising a loading arrangement which can be displaced in a direction transverse to a longitudinal axis parallel to a direction of flow of the gas-liquid mixture in the second pipe connection so as to arrange a filter arrangement in a cleaning position above the second pipe connection.

8. The cleaning device of claim 7, further comprising a second adjustment motor assigned to the loading arrangement, by way of which the loading arrangement can be moved between the cleaning position and a loading position.

9. A method of cleaning a filter arrangement which has a first fluid connection, a second fluid connection, and a filter assembly arranged between the first fluid connection and the second fluid connection and which has a surface to which contaminants may adhere, the method using a cleaning device which comprises:
 (i) a generator device for generating a gas-liquid mixture, the generator device comprising a receiving chamber for receiving a liquid, and a pressurized gas generating device which can be connected to the receiving chamber,
 (ii) a first pipe assembly connected to the generator device and comprising a first pipe connection which can be connected to the first fluid connection so as to direct the gas-liquid mixture under pressure into the filter arrangement, and
 (iii) a second pipe assembly comprising a second pipe connection which can be connected to the second fluid connection and which is connected to a collection device for collecting the gas-liquid mixture passed through the filter arrangement and contaminants entrained from the filter arrangement,
 wherein the first pipe connection is arranged above the second pipe connection in a direction of gravity, wherein the first pipe assembly comprises a deflection pipe section which connects the receiving chamber of the generator device to the first pipe connection such that the receiving chamber can be filled with liquid prior to generation of the gas-liquid mixture without the liquid entering the filter arrangement, and wherein a liquid spraying device comprises a spray bar extending transversely to a direction of flow of the gas-liquid mixture in the second pipe assembly, a plurality of spray nozzles arranged on the spray bar and directed towards the filter assembly, a drive shaft connected to the spray bar, and a drive motor connected to the drive shaft, wherein the drive motor is located outside the second pipe assembly, the spray bar is located inside the second pipe assembly, and the drive shaft passes through the second pipe assembly, and
 wherein the second pipe assembly comprises a siphon-like pipe section in which spray liquid and contaminants separated from the filter assembly by way of the liquid spraying device can collect,
 the method comprising the steps of:
 arranging the filter arrangement in a cleaning device, such that the second fluid connection faces downward and the first fluid connection is connected to the receiving chamber via the deflection pipe section, at least partially filling the receiving chamber with a liquid, and generating a cleaning pulse in which gas from the pressurized gas generating means is directed under pressure into the receiving chamber for a period of time less than 5 seconds so that a gas-liquid mixture is driven, via the deflection pipe section, from above into the filter assembly, through the filter assembly and out of the second fluid connection.

10. The method of claim 9, wherein prior to generating the cleaning pulse, a side of the filter assembly assigned with the second fluid connection, is cleaned by means of the liquid spraying device.

* * * * *